United States Patent
Schwecke et al.

(10) Patent No.: US 12,038,038 B2
(45) Date of Patent: Jul. 16, 2024

(54) T-JOINT CONNECTOR DEVICE

(71) Applicant: Rhino Rack Australia Pty Limited, Eastern Creek (AU)

(72) Inventors: Colin Schwecke, Eastern Creek (AU); Marcello Dacunha, Eastern Creek (AU); William Davis, Eastern Creek (AU)

(73) Assignee: Rhino Rack Australia Pty Limited, Eastern Creek (AU)

( * ) Notice: Subject to any disclaimer, the term of this patent is extended or adjusted under 35 U.S.C. 154(b) by 2 days.

(21) Appl. No.: 17/725,748

(22) Filed: Apr. 21, 2022

(65) Prior Publication Data
US 2022/0341450 A1      Oct. 27, 2022

(30) Foreign Application Priority Data

Apr. 21, 2021   (AU) .................................. 2021901181

(51) Int. Cl.
*F16B 7/04*      (2006.01)
*E06B 3/964*     (2006.01)

(52) U.S. Cl.
CPC .............. *F16B 7/044* (2013.01); *E06B 3/964* (2013.01)

(58) Field of Classification Search
CPC ...... E06B 3/964; E06B 3/9642; E06B 3/9687; F16B 7/044; F16B 7/0473; F16B 7/187; F16B 2200/67; E04B 2/766; Y10T 403/4602; Y10T 403/73; E04H 17/1488
See application file for complete search history.

(56) References Cited

U.S. PATENT DOCUMENTS

| 3,864,051 A | * | 2/1975 | Reid ..................... F16B 7/0446 411/180 |
| 3,879,017 A | * | 4/1975 | Maxcy .................. E04F 11/181 256/22 |
| 4,270,681 A |   | 6/1981 | Ingram |
| 4,456,299 A | * | 6/1984 | Steinmetz ................ A47C 4/02 403/231 |
| 4,678,359 A | * | 7/1987 | Keen .................. A47B 47/0008 403/403 |

(Continued)

FOREIGN PATENT DOCUMENTS

| DE | 202013101492 U1 * | 6/2013 | ............. E06B 3/964 |
| EP | 2354419 A2 * | 8/2011 | ........... E06B 3/9642 |

(Continued)

OTHER PUBLICATIONS

PCT, Australia Patent Office, International-Type Search Report and Written Opinion, by the ISA/AU, dated Apr. 1, 2022, regarding National Application No. 2021901181.

*Primary Examiner* — Matthew R McMahon

(57) ABSTRACT

The present invention relates to a device to slidingly connect an end of a first element to a side of a second element, the second element side having a channel extending therealong, the device comprising a device body having a fixable end and a slidable end, the fixable end being adapted to be affixed to the end of the first element, and a protrusion extending from the slidable end of the device body, configured to engage with the channel of the second element and slide therealong, wherein the device body is formed in at least a first and second device body portion, the first and second device body portions being separable.

12 Claims, 5 Drawing Sheets

(56) References Cited

U.S. PATENT DOCUMENTS

| | | | | |
|---|---|---|---|---|
| 5,307,575 | A * | 5/1994 | Ivansson | A47G 1/0611 40/784 |
| 5,494,370 | A * | 2/1996 | Habicht | F16B 7/0446 403/231 |
| 5,498,099 | A * | 3/1996 | Scheuer | E06B 3/9642 403/402 |
| 5,618,127 | A * | 4/1997 | Tonsmann | E06B 3/9642 403/403 |
| 5,875,600 | A * | 3/1999 | Redman | E06B 3/9642 52/656.9 |
| 7,698,871 | B2 * | 4/2010 | Mansueto | E06B 3/9642 52/656.9 |
| 8,708,169 | B1 * | 4/2014 | Chen | F16B 7/187 403/252 |
| 10,206,506 | B1 * | 2/2019 | Lai | A47B 96/1433 |
| 11,180,947 | B2 * | 11/2021 | Alkarram | E06B 3/964 |
| 2021/0123466 | A1 * | 4/2021 | Sylvan | F16B 2/22 |

FOREIGN PATENT DOCUMENTS

| | | |
|---|---|---|
| GB | 2159198 A | 11/1985 |
| WO | 2012137059 A1 | 10/2012 |
| WO | 2014127472 A1 | 8/2014 |

* cited by examiner

T-JOINT CONNECTOR DEVICE

PRIORITY DETAILS

The present application claims priority from AU 2021901181, filed in Australia on 21 Apr. 2021, the entirety of which is incorporated herein by reference for all purposes.

TECHNICAL FIELD

The present invention relates generally to the field of extrusions, and more particularly to forming angled joints between two extruded elements.

BACKGROUND

As the skilled person will appreciate, the nature of the extrusion process means that the extrusion cross-section is essentially uniform along its entire length—in short, a characteristic of an extruded material is that its cross-section is unchanging. An advantage of this manufacturing process is that an end user can trim an extruded element to any particular length and be assured that the cross-sectional properties will remain constant—i.e. no internal support structures will be severed, since a particular internal support structure will be present for the entire extrusion length. Because of this, extrusion lengths are versatile and provide a degree of scalability in the structural design without substantially sacrificing the strength and rigidity provided by bespoke construction.

It is further advantageous to be able to attach two extruded lengths to one another in configurations other than end-to-end, to enable modular structures such as platforms, cross-rails, fences, or other structures extending in two or three dimensions to be built. However, the introduction of structures that extend in a direction non-parallel to the extrusion length can only be readily and economically achieved through post-extrusion manufacturing processes. One example of such post-extrusion processes is the boring of mounting apertures.

As the skilled person will appreciate, the presence of these post-extrusion processes severely inhibit the ability for any structure using extrusion lengths to be scaled—altering the length of an extrusion will alter the relative position of any fastening structures introduced through a post-extrusion process, or may remove it altogether. Additionally, an end user may have the basic knowledge to cut an extrusion to a desired length, but may not possess the equipment and/or knowledge to reapply the post-extrusion processes.

Thus, to provide for end users who do not have substantial metalworking experience or equipment, suppliers will produce prior art extrusions at a range of lengths with post-extrusion processes pre-applied. This compromise allows a modicum of scalability, as the end user can purchase an extrusion of any offered length and be assured that the cross-section will be relatively constant (apart from post-extrusion modification processes), but without the necessary skills and equipment the end user is limited to only the lengths specifically produced and sold by the supplier or custom-ordering a specific length, which carries associated costs of bespoke production.

The present invention seeks to provide, in at least one embodiment, a means of substantially improving the modularity and scalability of constructions utilizing extrusion lengths. The present invention further seeks to provide, in at least one embodiment, a means of alleviating, overcoming or at least ameliorating one or more disadvantages of the prior art.

DISCLOSURE OF THE INVENTION

In a first aspect, the present invention relates to a device to slidingly connect an end of a first element to a side of a second element, the second element side having a channel extending therealong, the device comprising a device body having a fixable end and a slidable end, the fixable end being adapted to be affixed to the end of the first element, and a protrusion extending from the slidable end of the device body, configured to engage with the channel of the second element and slide therealong, wherein the device body is formed in at least a first and second device body portion, the first and second device body portions being separable.

In an embodiment the first device body portion comprises the fixable end and the second device body portion comprises the slidable end.

In an embodiment the first and second device body portions each comprise a fixable end and a slidable end.

In an embodiment the fixable end comprises a fixable end aperture and a fastener extending therethrough, and the fixable end aperture is arranged such that, in use, the fastener extending therethrough is received by an aperture located at the end of the first element and that is substantially parallel to a length thereof.

In an embodiment, the device further comprises a slidable end aperture located at the slidable end of the device body, and a fastener extending through the aperture, wherein the slidable end aperture is arranged such that, in use, the fastener extends into the channel of the second element, and the fastener is able to be tighteningly engaged with the channel so as to fix the device at a position therealong.

In an embodiment the device body comprises an opening on a side thereof, the opening providing access to the slidable end aperture and to the fastener extending therethrough when the fixable end of the device body is affixed to the end of the first element.

In an embodiment, the device further comprises a device cover that attaches to the device body, wherein the attached device cover substantially closes the opening, substantially enclosing the fastener therewithin, and the device body cover is shaped to substantially conform to at least one of a portion of a cross-section profile of the first element, and a portion of a longitudinal profile of the second element.

In an embodiment, the device cover comprises an engaging element configured to reversibly engage a receiving element on the device body.

In an embodiment, the present invention comprises a device to slidingly connect an end of a first element to a side of a second element, the device comprising a device body having a fixable end adapted to be affixed to the end of the first element, a slidable end, and first and second device body frames extending therebetween, the first and second device body frames spaced apart from and arranged parallel to one another, a fastener outwardly extending from the slidable end, the fastener being adapted to cooperate with a channel extending along a side of the second element, and an opening into the space between the first and second device body frames providing access to an actuable end of the fastener.

In an embodiment, the device further comprises a protrusion extending from the slidable end of the device body, the protrusion being adapted to engage with the channel extending along the side of the second element and slide thereaolong.

In an embodiment, the fixable end comprises a first fixing means on an end of the first device body frame proximal thereto, and a second fixing means on an end of the second device body frame proximal thereto.

In an embodiment, the device further comprises a connecting structure extending between the first and second device body frames. In an embodiment, the fastener outwardly extends from the connecting structure.

In an embodiment, the device body is formed as at least two components.

In an embodiment, the device further comprises a device cover configured to attach to the device body and substantially encapsulate the actuable end of the fastener, wherein the device body cover is shaped to substantially conform to at least one of a portion of a cross-section profile of the first element and a portion of a longitudinal profile of the second element.

In an embodiment, the space between the first and second device body frames is open on both a first side and a second, opposing side of the device body, and the device cover attaches to the first side of the device body, further wherein the device cover further comprises a plug element adapted to extend into and through the space between the first and second device body frames and substantially plug, block or otherwise close the opening of the space on the second, opposing side of the device body.

In an embodiment, the device cover comprises an engaging element configured to reversibly engage a receiving element on the device body.

In an embodiment, at least one of the first and second device body frames comprise the receiving element.

In an embodiment, the engaging element comprises one of a hooking element and a catch element, and the receiving element comprises the other of the catch element and the hooking element.

In an embodiment, the engaging element inwardly extends from a side wall of the device cover, and the side wall is resiliently flexible, such that an inward flexing of the side wall disengages the engaging element from the receiving element.

In an embodiment, the fixable end is adapted to receive a further fastener therethrough for affixing to the end of the first element, and upon being fixed to the end of the first element, the further fastener extends substantially parallel to a length thereof.

In an embodiment, an actuable end of the further fastener is within the first or second device body frame, and an end of the aforementioned first or second device body frame that is proximal to the slidable end of the device body is open to provide access to the actuable end of the further fastener.

Further embodiments may be disclosed herein. These and other embodiments are considered to fall within the scope of the invention.

DESCRIPTION OF FIGURES

Embodiments of the present invention will now be described in relation to figures, wherein.

DETAILED DESCRIPTION OF PREFERRED EMBODIMENTS

Figure 1:
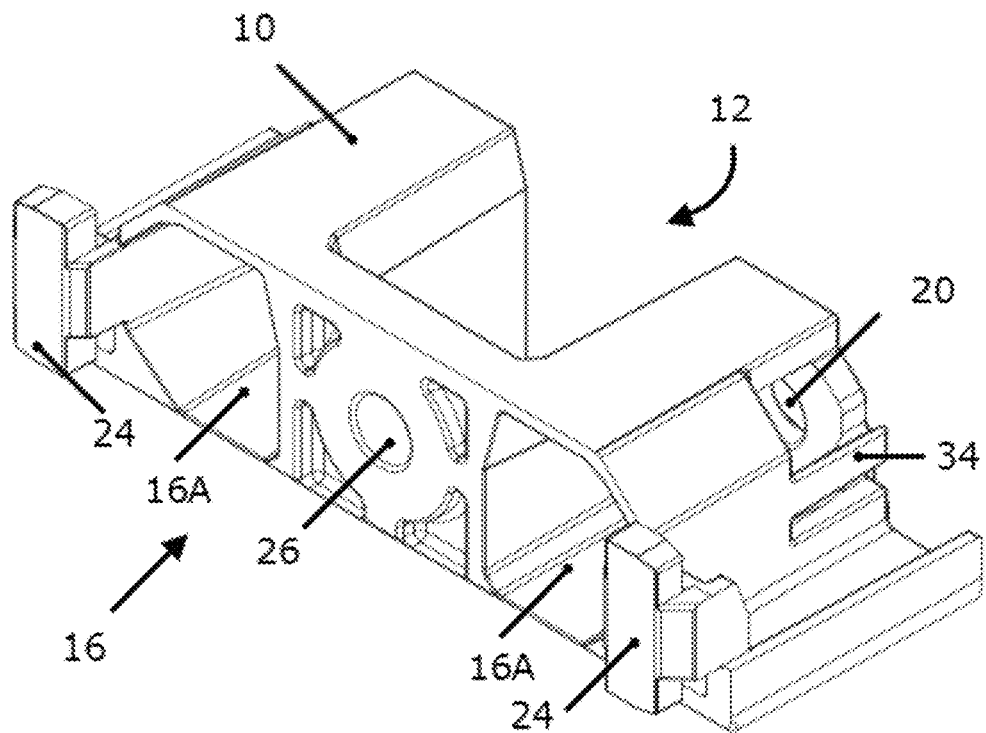
FIG. 1 depicts an embodiment of the device of the present invention.
Figure 2:
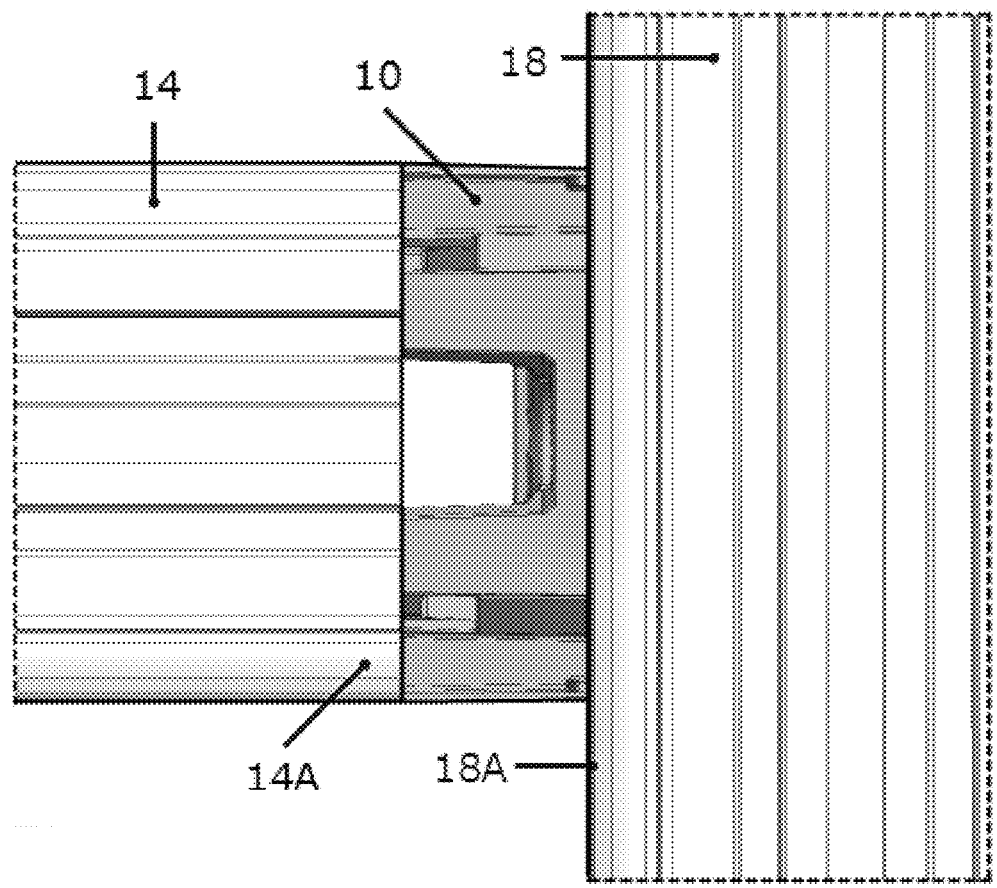
FIGS. 2-7 depict the device of FIG. 1 in use and from different angles.

In a first aspect, the present invention provides a device to slidingly connect an end of a first element to a side of a second element. With reference to FIGS. 1 & 2, in an embodiment the device comprises a device body 10 having a fixable end 12 adapted to be affixed to the end 14A of the first element 14, and a slidable end 16 that is adapted to engage with a side 18A of the second element 18. In a further embodiment, at least one of the first and second elements 14, 18 are formed via an extrusion process and do not require post-extrusion processes in order for the device body 10 to affix thereto.

The device may provide a means of adapting the end 14A of the first element 14 to be joinable to the side 18A of the second element 18, thereby forming a 'T' shape comprising a 'stem' (being the vertical line of the letter T and formed by the first element 14) and a 'bar' (being the horizontal line of the letter T and formed by the second element 18). The skilled person will appreciate that the term "T-shaped" should not be interpreted to imply that the stem and bar are arranged at right angles, or that the stem must extend vertically and the bar horizontally. Rather, by varying the angle between the fixable end 12 and slidable end 16, the device body 10 may enable an end of the first element 12 to be joined to the side of the second element 18 at a range of angles.

Figure 3:
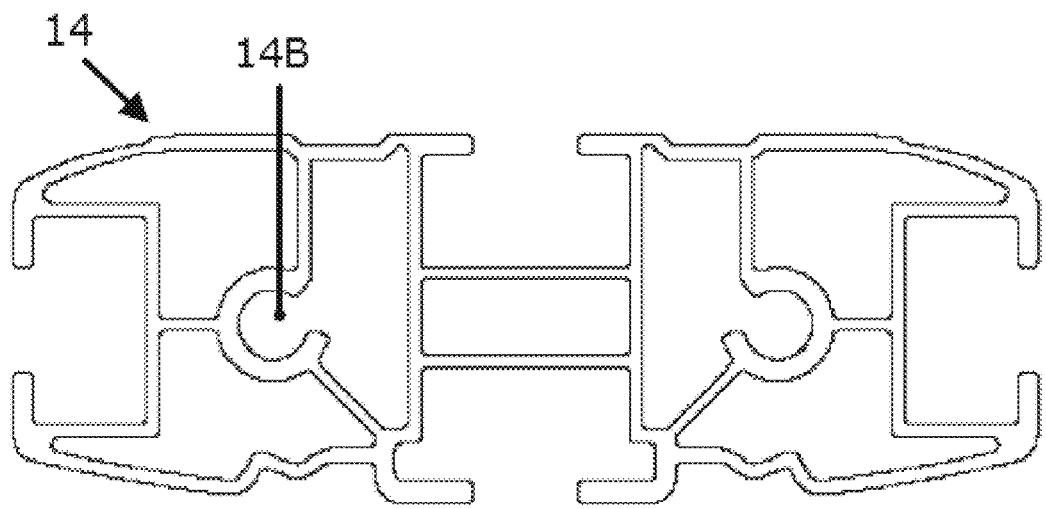

With reference to FIG. 3 in addition to FIGS. 1 & 2, in an embodiment wherein the end 14A of the first element 14 comprises an aperture 14B therealong and substantially parallel to a length thereof, the fixable end 12 of the device may comprise an aperture 20 for a fastener (not shown) to extend therethrough and engage with the aperture in the first element end 14A, thereby affixing the device to the first element 14.

Figure 4:
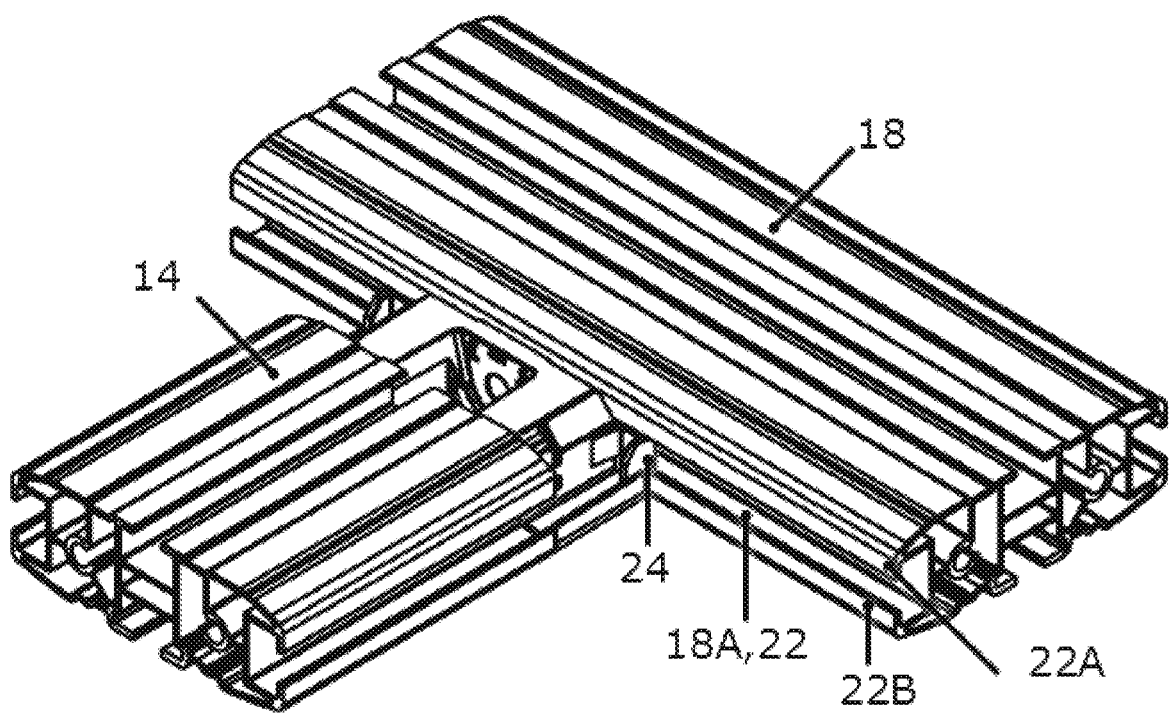
Figure 5:
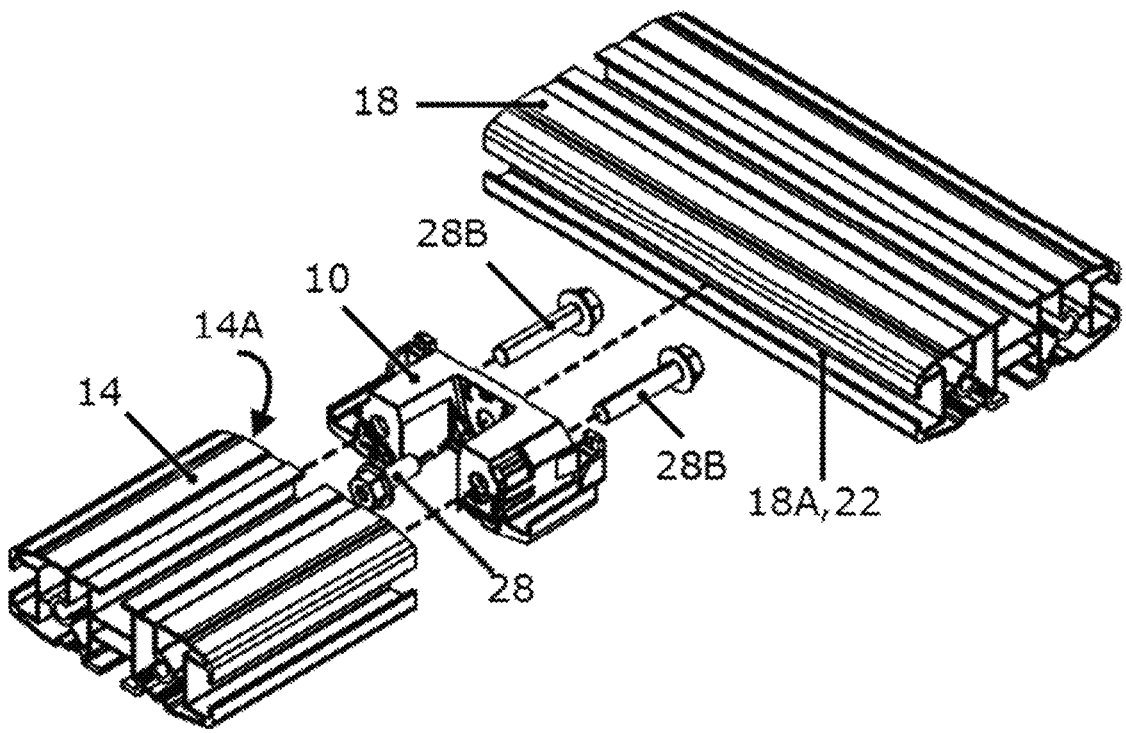

With reference to FIGS. 4 & 5, in an embodiment wherein the second element 18 comprises a channel 22 extending along the side 18A thereof, the slidable end 16 of the device may be adapted to engage with said channel.

In one embodiment and with return reference to FIG. 1, the slidable end 16 of the device may comprise a protrusion 24 extending therefrom, the protrusion being shaped to engage with the channel 22 of the second element 18. In an embodiment, the protrusion 24 may be shaped to, when seen from a side of the device, extend outwardly from the device for a distance before extending upwardly and/or downwardly (with respect to the orientation depicted in the figures) to comprise a flange-like shape. In use, the channel flanges 22A, 22B may sit between the device body 10 and the flange-like portion of the protrusion 24.

Figure 6:
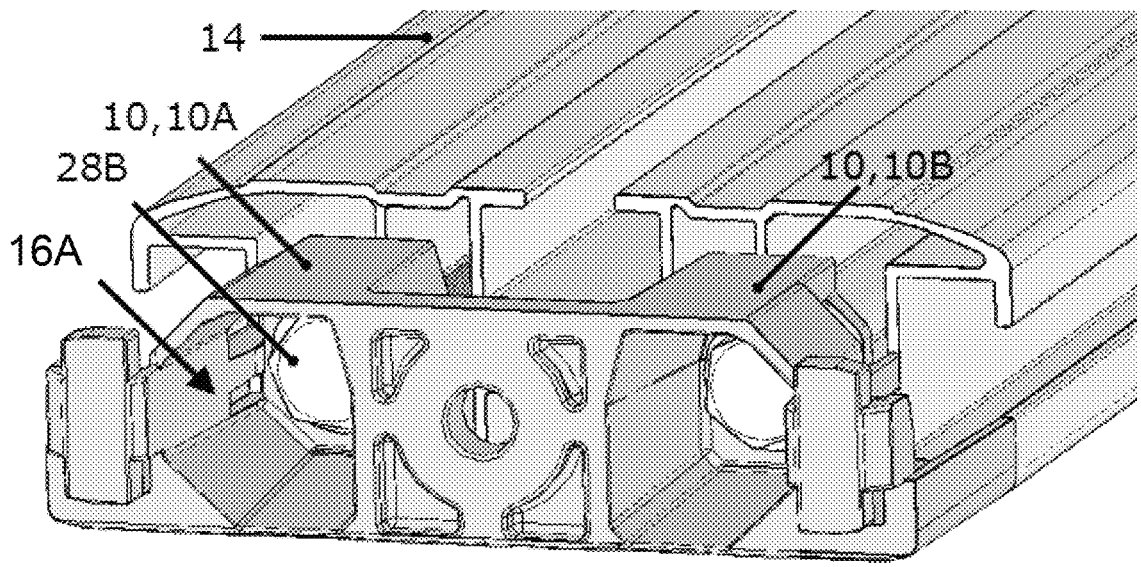

In an embodiment and with reference to FIGS. 1 and 6, the slidable end 16 of the device may comprise a fastener 28 extending outwardly therefrom. In use, the fastener 28 may extend into the channel 22 and tighteningly engage therewithin. The device may therefore be fixed at a position along the channel 22 of the second element 18. Similarly, loosening the fastener 28 may free the device to slide along the channel, enabling repositioning thereof. In some embodiments, the fastener 28 may comprise a means of directly engaging against the channel flanges 22A, 22B. For example, the fastener 28 may be adapted to expand or deploy within the channel 22. In alternative embodiments the fastener 28 may cooperate with a secondary element that sits within the channel 22, such as a channel nut.

In an embodiment, the device may comprise an opening 30 on a side thereof, which provides access to the actuable end of the fastener 28 extending therethrough, even when the fixable end 12 is affixed to the end 14A of the first element 14. This may enable the fastener 28 to be loosened or tightened, thereby enabling repositioning of the device (and thus the first element 14) along the length of the second element 18 without requiring complete disassembly. In an embodiment the fastener 28 may extend through a slidable end aperture 26.

In an embodiment and with particular reference to FIGS. 5 & 6, the fixable end 12 may comprise a fixable end aperture 20 proximal to an end of the of the device body 10. The device body 10A may be open 16A at a slidable end thereof to provide access to an actuable end of a further fastener 28B extending through the fixable end aperture 20 for engagement with an end 14A of the first element 14. The further fastener, upon engagement with the end 14A of the first element 14, may extend substantially parallel to a length thereof.

Figure 9:
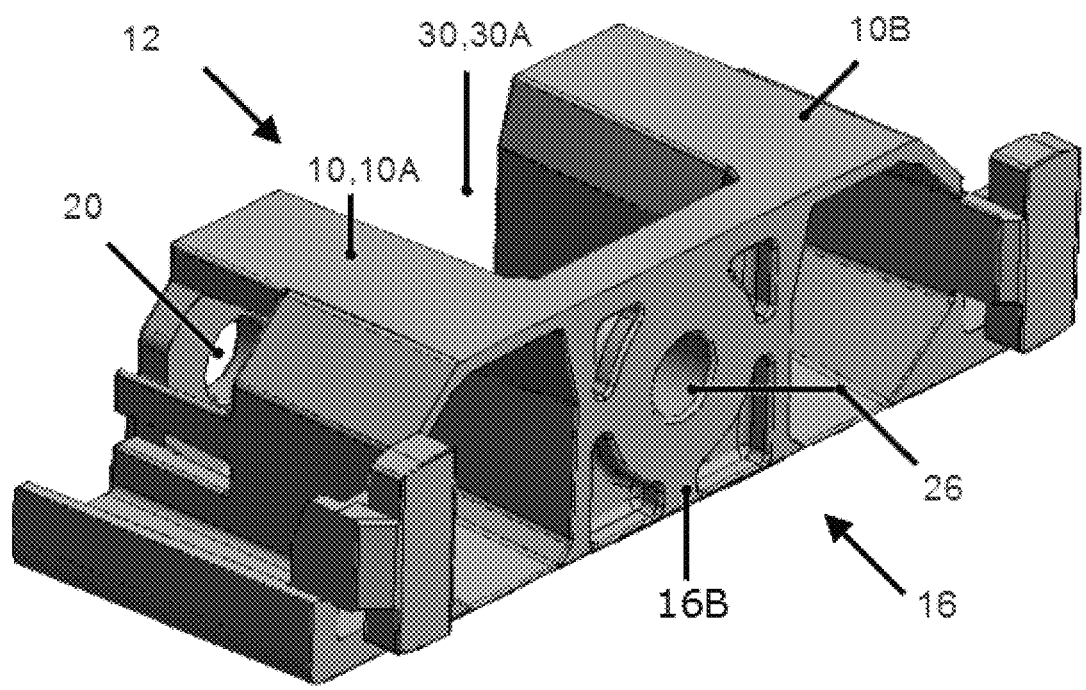
FIGS. 9 & 10 depict an alternate embodiment of the device both without and with a cover.

In one embodiment and with reference to FIG. 9, the device body 10 may comprise a first device body frame 10A extending between the fixable end 12 and the slidable end 16. In a further embodiment, the device body may comprise a second device body frame 10B, arranged parallel to the first device body frame 10A and spaced apart therefrom, having substantially similar properties to the first device body frame 10A.

In an embodiment and with further reference to FIG. 6, the fixable end 12 may comprise a fixable end aperture 20 proximal to an end of the of the first device body frame 10A and/or to an end of the second device body frame 10B. The respective device body frame 10A, 10B may be open 16A at a slidable end thereof to provide access to an actuable end of a further fastener 28B extending through the fixable end aperture 20 for engagement with an end 14A of the first element 14. The further fastener, upon engagement with the end 14A of the first element 14, may extend substantially parallel to a length thereof.

Figure 8:
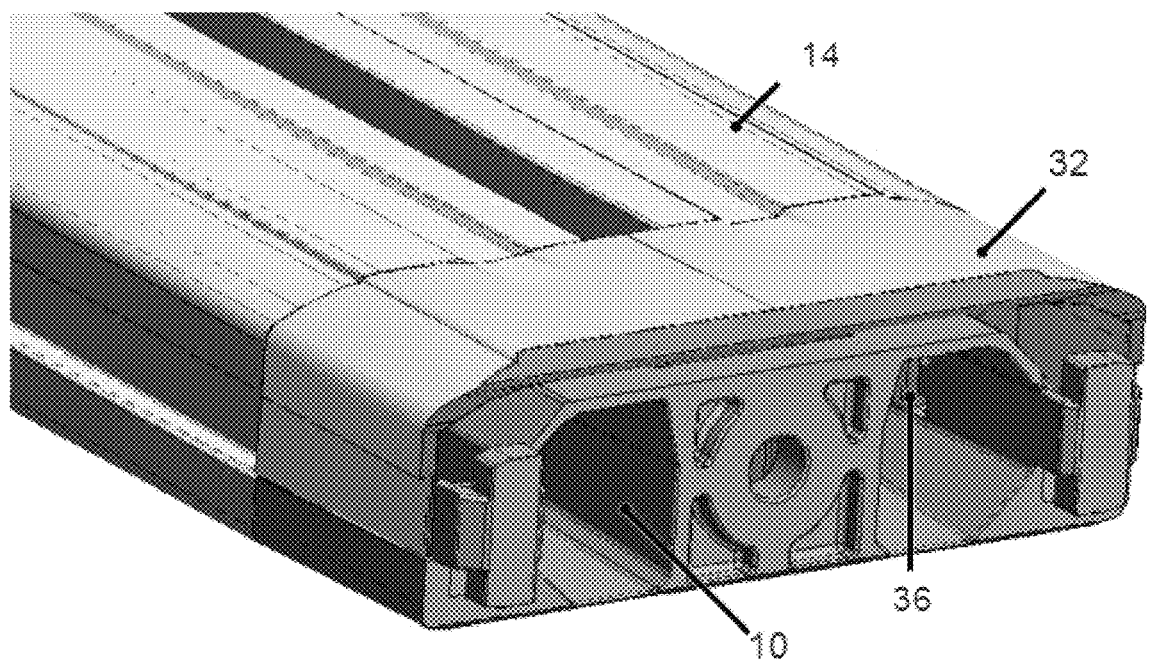
FIG. 8 depicts an embodiment of the device having a cover.

In an embodiment and with reference to FIG. 8, the device may further comprise a cover 32 that attaches to the device body 10. In an embodiment wherein the device body 10 comprises an opening 30 on a side thereof, the cover may be configured to—upon attachment—substantially close over the opening 30, thereby substantially enclosing the fastener 28 within. In an embodiment, the cover 32 may be shaped to substantially conform to at least one of a portion of a cross-section profile of the first element 14, and/or a portion of a longitudinal profile of the second element 18. In use, the cover may provide a measure of security and/or protection to the device. For example, the cover may prevent dirt, grime or other debris from accumulating within the opening 30, and may prevent weather damage to the fastener 28.

In one embodiment, the cover 32 may comprise multiple portions to substantially enclose the device body 10 on all sides. In an alternative embodiment, a portion of the device body 10 may be shaped to conform to a portion of the end profile of the first element 14 and/or side profile of the second element 18, with the device cover 32 attaching to the remaining portion of the device body 10 and conforming to a second portion of the end profile of the first element 14 and/or side profile of the second element 18

Figure 7:
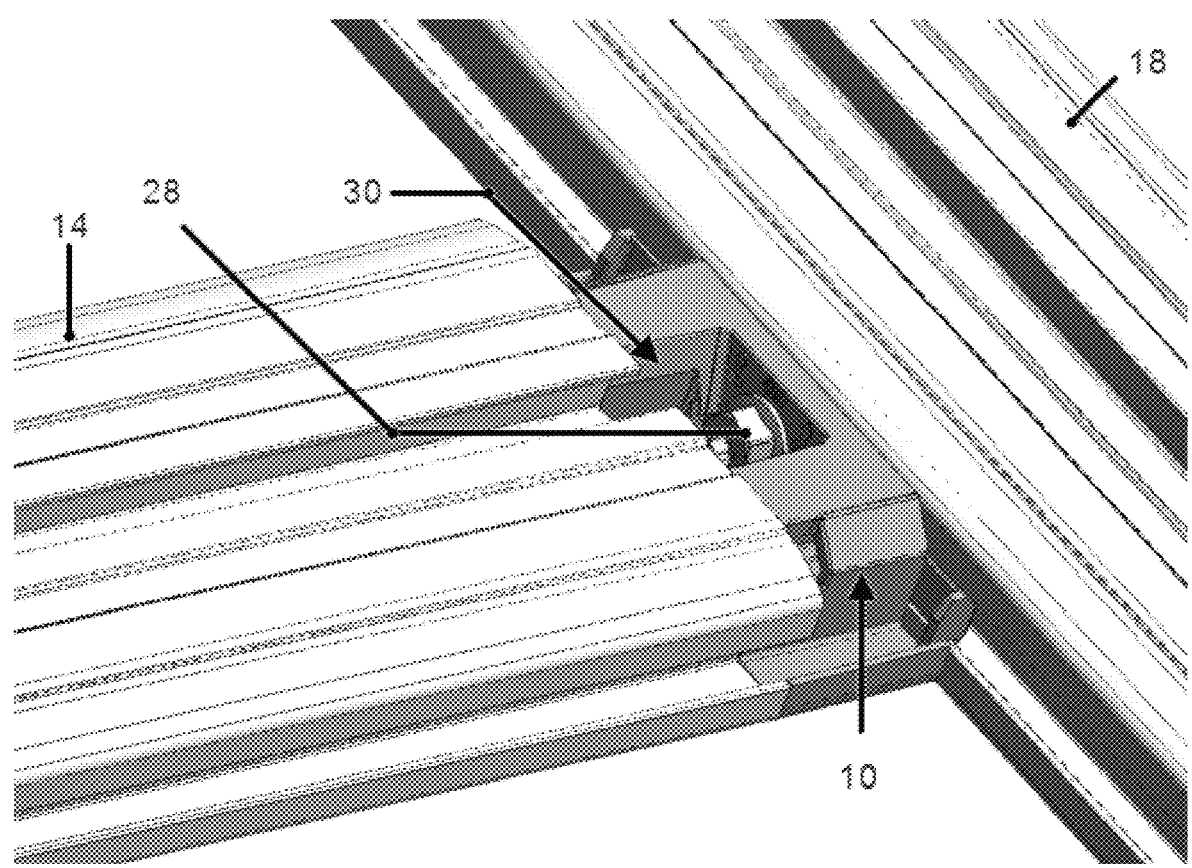

In an embodiment and with reference to FIGS. 1 and 7, the device body 10 may comprise a receiving element 34, and the device cover 32 may comprise an engaging element 36. The engaging element 36 may be configured to reversibly engage with the receiving element 34, thereby reversibly attaching the cover 32 to the device body 10. In a further embodiment, the engaging element 36 may comprises one of a hook and a catch, and the receiving element 34 comprises the other of the catch and the hook.

In an embodiment, the engaging element 36 may extend inwardly from a side wall of the device cover. In such an embodiment, the side wall may be resiliently flexible, such that an inward flexing thereof disengages the engaging element 36 from the receiving element 34.

In an embodiment, the receiving element 34 may be formed in a side wall of the first device body frame 10A and/or the second device body frame 10B.

In an embodiment, as the device body frames 10A, 10B, are spaced apart, an opening 30 may be formed therebetween to provide access to the actuable end of the fastener 28. In a further embodiment, the space between the first device body frames 10A, 10B may be open on both sides, such that there are openings 30A, 30B on multiple sides and access is provided to the head of the fastener 28 from multiple directions, even when the fixable end 12 of the device body 10 is affixed to the end of the first element 14.

Figure 10:
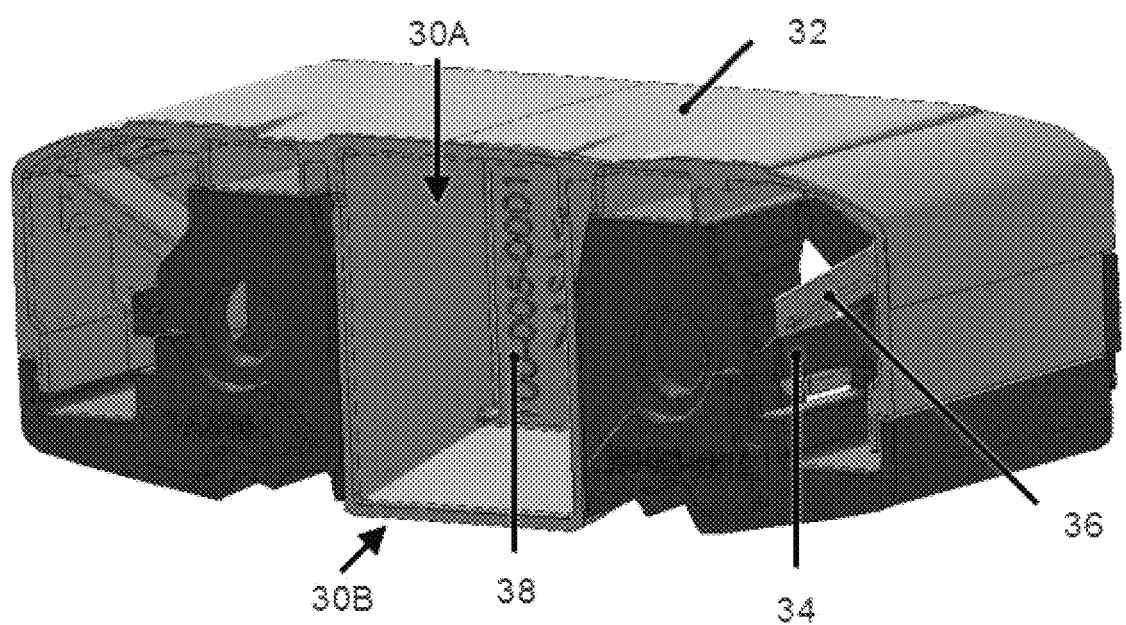

With reference to FIGS. 9 & 10, in an embodiment wherein the space between the first device body frames 10A, 10B is open on both sides, a device cover 32 may be attached to close off both openings 30A, 30B. In an embodiment, the cover 32 may comprise a plug element 38 configured to extend into the space between the first and second device body frames 10A,10B, such that a distal end of the plug element 38 substantially plugs, blocks or otherwise closes the opening 30B of the space on the second, opposing side of the device body 10.

In an embodiment, a connecting structure 16B may extend between the slidable end 16 of each of the first and second device body frames 10A, 10B. In a further embodiment, the fastener 28 may outwardly extend from the connecting structure 16B. This may be through a slidable end aperture 26.

In an embodiment (not shown in the figures), the device body 10 may be formed as separate device body portions. In one form, a first device body portion may comprise the fixable end 12, and a second, complementary device body portion may comprise the slidable end 16 that may or may not comprise a connecting structure 16B. In an alternate form, a first device body portion and a second device body portion may each comprise their own fixable end 12 and slidable end 16.

In embodiments wherein the device body is formed of a first device body frame 10A and second device body frame 10B, these may be formed as first and second device body portions that are separate and separable from one another. In such an embodiment, each of the first device body frame 10A and second device body frame 10B may comprise their own first ends 12, slidable ends 16 and protrusions 24. One or both of the first device body frame 10A and second device body frame 10B may comprise a fastener 28 outwardly extending from their respective slidable ends 16.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Any promises made in the present document should be understood to relate to some embodiments of the invention, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

The invention claimed is:

1. A device to slidingly connect an end of a first element to a side of a second element, the device comprising:
    a device body having a fixable end adapted to be affixed to the end of the first element, a slidable end, and first and second device body frames extending therebetween, the first and second device body frames spaced apart from and arranged parallel to one another;
    a fastener outwardly extending from the slidable end, the fastener being adapted to cooperate with a channel extending along a side of the second element;
    an opening into the space between the first and second device body frames providing access to an actuable end of the fastener when the fixable end is fully affixed to the end of the first element;
    a device cover configured to attach to the device body and substantially encapsulate the actuable end of the fastener; and
    wherein the device cover is shaped to substantially conform to at least one of a portion of a cross-section profile of the first element and a portion of a longitudinal profile of the second element.

2. The device of claim 1, further comprising a protrusion extending from the slidable end of the device body, the protrusion being adapted to engage with the channel extending along the side of the second element and slide thereealong.

3. The device of claim 1, wherein the fixable end comprises a first fixing means on an end of the first device body frame proximal thereto, and a second fixing means on an end of the second device body frame proximal thereto.

4. The device of claim 1, further comprising a connecting structure extending between the first and second device body frames.

5. The device of claim 4, wherein the fastener outwardly extends from the connecting structure.

6. The device of claim 1, wherein the space between the first and second device body frames is open on both a first side and a second, opposing side of the device body; and
    the device cover attaches to the first side of the device body;
    further wherein the device cover further comprises a plug element adapted to extend into and through the space between the first and second device body frames and substantially plug, block or otherwise close the opening of the space on the second, opposing side of the device body.

7. The device of claim 1, wherein the device cover comprises an engaging element configured to reversibly engage a receiving element on the device body.

8. The device of claim 7, wherein at least one of the first and second device body frames comprise the receiving element.

9. The device of claim 7, wherein the engaging element comprises one of a hooking element and a catch element; and
    the receiving element comprises the other of the catch element and the hooking element.

10. The device of claim 7, wherein the engaging element inwardly extends from a side wall of the device cover; and
    the side wall is resiliently flexible, such that an inward flexing of the side wall disengages the engaging element from the receiving element.

11. The device of claim 1, wherein the fixable end is adapted to receive a further fastener therethrough for affixing to the end of the first element; and
    upon being fixed to the end of the first element, the further fastener extends substantially parallel to a length thereof.

12. The device of claim 11, wherein an actuable end of the further fastener is within the first or second device body frame; and
    an end of the aforementioned first or second device body frame that is proximal to the slidable end of the device body is open to provide access to the actuable end of the further fastener.

* * * * *